United States Patent
Kulbida et al.

(10) Patent No.: US 11,605,183 B2
(45) Date of Patent: Mar. 14, 2023

(54) ALIGNING AND MERGING CONTENTS FROM MULTIPLE COLLABORATIVE WORKSTATIONS

(71) Applicant: Konica Minolta Business Solutions U.S.A., Inc., San Mateo, CA (US)

(72) Inventors: Jie Kulbida, Broomfield, CO (US); Ronald O'Farrell, Lake Mary, FL (US); David Beck, Lake Mary, FL (US); Kevin Beck, Lake Mary, FL (US); Jason Grams, Westminster, CO (US)

(73) Assignee: Konica Minolta Business Solutions U.S.A., Inc., San Mateo, CA (US)

( * ) Notice: Subject to any disclaimer, the term of this patent is extended or adjusted under 35 U.S.C. 154(b) by 749 days.

(21) Appl. No.: 16/587,473

(22) Filed: Sep. 30, 2019

(65) Prior Publication Data
US 2021/0097719 A1    Apr. 1, 2021

(51) Int. Cl.
*G06T 7/80* (2017.01)
*H04N 9/31* (2006.01)
*G03B 21/14* (2006.01)
*G03B 21/132* (2006.01)

(52) U.S. Cl.
CPC .............. *G06T 7/85* (2017.01); *G03B 21/132* (2013.01); *G03B 21/142* (2013.01); *H04N 9/3194* (2013.01); *G06T 2207/30204* (2013.01)

(58) Field of Classification Search
CPC ...... G06T 7/85; G03B 21/132; G03B 21/142; H04N 9/3194

USPC ......................................................... 382/154
See application file for complete search history.

(56) References Cited

U.S. PATENT DOCUMENTS

| | | | |
|---|---|---|---|
| 6,618,076 B1 | 9/2003 | Sukthankar et al. | |
| 9,369,632 B2 | 6/2016 | Short | |
| 2018/0063493 A1* | 3/2018 | Unver | H04N 9/3182 |
| 2022/0277485 A1* | 9/2022 | Achar | G06T 7/85 |

FOREIGN PATENT DOCUMENTS

| | | |
|---|---|---|
| JP | 2005-012716 A | 1/2005 |
| JP | 2014-022063 A | 2/2014 |

\* cited by examiner

*Primary Examiner* — Jerry L Brooks
(74) *Attorney, Agent, or Firm* — Osha Bergman Watanabe & Burton LLP (57) ABSTRACT

A method for aligning and merging contents from multiple collaborative workstations. Collaborative workstations are multiple workstations that contribute respective contents to be combined into a single computer-generated output. The content generated from each collaborative workstation is the collaborative content. Individual collaborative content is created from each workstation by a user drawing on a piece of paper that is placed on a workspace surface of the workstation. Collaborative contents contributed by multiple workstations are aligned such that a combined product (i.e., a single computer-generated output) including both virtual and physical content appears to be collaboratively drawn by multiple users on a single piece of paper.

20 Claims, 7 Drawing Sheets

ALIGNING AND MERGING CONTENTS FROM MULTIPLE COLLABORATIVE WORKSTATIONS

BACKGROUND

Augmented Reality (AR) allows a user to interact with a computer-generated output overlaid on or around objects in a real-world environment. The real-world environment augmented by the overlaying computer-generated output is referred to as the AR environment. In other words, the AR environment is the combination of the real-world environment and the overlaying computer-generated output. In some cases, the computer-generated output may be projected into the real-world environment such that the user does not have to hold a smartphone or wear AR glasses.

SUMMARY

In general, in one aspect, the invention relates to a method to process collaborative contents from multiple workspace. The method includes capturing, using a first camera device, a first image of a first workspace surface, wherein the first camera device and a first projector device are associated with the first workspace surface, generating, by a computer processor and from the first image based at least on a calibrated camera transformation of the first camera device, a first device independent image of the first workspace surface, wherein the calibrated camera transformation of the first camera device is based on a camera pixel resolution of the first camera device, and a camera angle and a camera distance of the first camera device in reference to the first workspace surface, generating, by the computer processor and from the first device independent image based on a calibrated projector transformation of a second projector device, a first scaled image of the first workspace surface, wherein the calibrated projector transformation of the second projector device is based on a projector pixel resolution of the second projector device, and a projector angle and a projector distance of the second projector device in reference to a second workspace surface, wherein a second camera device and the second projector device are associated with the second workspace surface, and projecting, using the second projector device, the first scaled image of the first workspace surface onto the second workspace surface.

In general, in one aspect, the invention relates to a system to process collaborative contents from multiple workspace. The system includes a first workstations comprising a first camera device, a first projector device, and a first workspace surface, wherein the first camera device is configured to capture a first image of the first workspace surface, a second workstations comprising a second camera device, a second projector device, and a second workspace surface, wherein the second projector device is configured to project a first scaled image of the first workspace surface onto the second workspace surface, and a computer processor configured to generate, from the first image based at least on a calibrated camera transformation of the first camera device, a first device independent image of the first workspace surface, wherein the calibrated camera transformation of the first camera device is based on a camera pixel resolution of the first camera device, and a camera angle and a camera distance of the first camera device in reference to the first workspace surface, and generate, from the first device independent image based on a calibrated projector transformation of the second projector device, the first scaled image of the first workspace surface, wherein the calibrated projector transformation of the second projector device is based on a projector pixel resolution of the second projector device, and a projector angle and a projector distance of the second projector device in reference to a second workspace surface.

In general, in one aspect, the invention relates to a non-transitory computer readable medium (CRM) storing computer readable program code to process collaborative contents from multiple workspace surfaces. The computer readable program code, when executed by a computer processor, include functionality for obtaining, from a first camera device, a first image of a first workspace surface, wherein the first camera device and a first projector device are associated with the first workspace surface, generating, from the first image based at least on a calibrated camera transformation of the first camera device, a first device independent image of the first workspace surface, wherein the calibrated camera transformation of the first camera device is based on a camera pixel resolution of the first camera device, and a camera angle and a camera distance of the first camera device in reference to the first workspace surface, generating, from the first device independent image based on a calibrated projector transformation of a second projector device, a first scaled image of the first workspace surface, wherein the calibrated projector transformation of the second projector device is based on a projector pixel resolution of the second projector device, and a projector angle and a projector distance of the second projector device in reference to a second workspace surface, wherein a second camera device and the second projector device are associated with the second workspace surface, and sending, to the second projector device, the first scaled image of the first workspace surface for projecting onto the second workspace surface.

Other aspects of the invention will be apparent from the following description and the appended claims.

DETAILED DESCRIPTION

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method, a non-transitory computer readable medium (CRM), and a system for aligning and merging contents from multiple collaborative workstations. Collaborative workstations are multiple workstations that contribute respective contents to be combined into a single computer-generated output. In this context, the content generated from each collaborative workstation is referred to as the collaborative content. In one or more embodiments of the invention, individual collaborative content is created from each workstation by a user drawing on a piece of paper that is placed on a workspace surface of the workstation. Collaborative contents contributed by multiple workstations are aligned such that a combined product (i.e., a single computer-generated output) including both virtual and physical content appears to be collaboratively drawn by multiple users on a single piece of paper.

Figure 1:
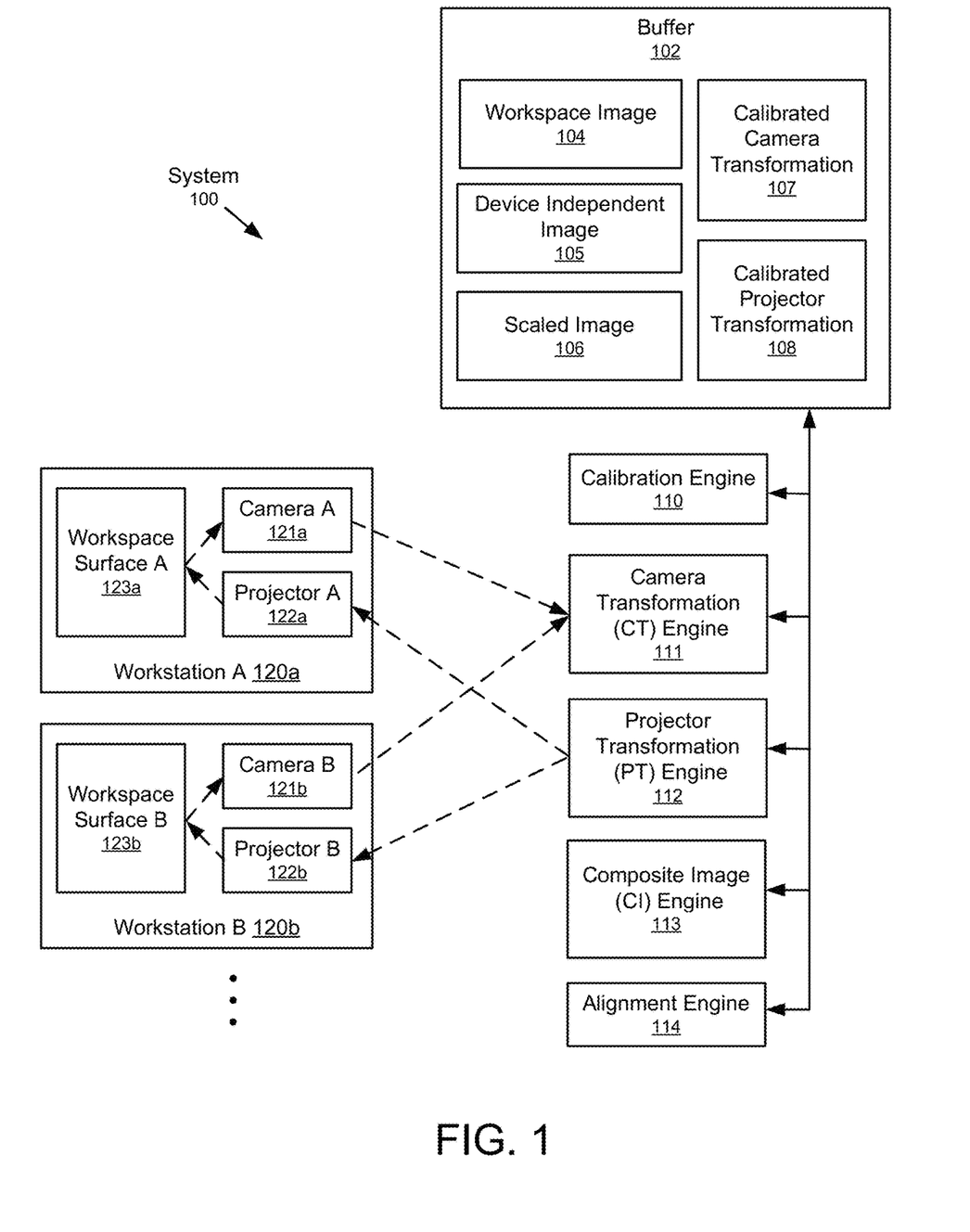
FIG. 1 shows a system in accordance with one or more embodiments of the invention.

FIG. 1 shows a system in accordance with one or more embodiments of the invention. As shown in FIG. 1, the system (100) has multiple components that may include, for example, a buffer (102), a calibration engine (110), a camera transformation engine (herein referred to as "CT engine") (111), a projector transformation engine (herein referred to as "PT engine") (112), a composite image engine (herein referred to as "CI engine") (113), and an alignment engine (114). Furthermore, the system (100) has multiple workstations (e.g., workstation A (120a), workstation B (120b), etc.) that communicate with these components (102, 110, 111, 112, 113, and 114). Each of these components (102, 110, 111, 112, 113, and 114) may be located on the same computing device (e.g., a personal computer (PC), laptop, tablet PC, smartphone, multifunction peripheral, kiosk, server, workstation, etc.) or on different computing devices connected by a network of any size having wired and/or wireless segments. Each of these components and workstations is discussed below.

The buffer (102) may be implemented in hardware (i.e., circuitry), software, or any combination thereof. The buffer (102) is configured to store a workspace image (104) and transformed versions of the workspace image (104). The buffer (102) is configured to store a calibrated camera transformation (107) and a calibrated projector transformation (108) that are transformation functions used to derive the transformed versions of the workspace image (104). The transformed versions of the workspace image (104) include a device independent image (105) and a scaled image (106). Multiple workspace images (104) and/or multiple sets of device independent images (105) and scaled images (106) may be stored in the buffer (102).

The workspace image (104) is an image of the workspace surface of a workstation, such as the workspace surface A (123a) of the workstation A (120a), the workspace surface B (123b) of the workstation B (120b), etc. The scaled image (106) is an image to be projected onto the workspace surface of a workstation (e.g., the workspace surface A (123a) of the workstation A (120a), the workspace surface B (123b) of the workstation B (120b), etc.). The device independent image (105) is an intermedia image for converting the workspace image (104) captured from one workstation to the scaled image (106) for projecting onto another workstation. The workspace image (104), device independent image (105) and scaled image (106) may be saved in the buffer (102) in any size and any imaging format (e.g., a JPEG image, a GIF image, a bitmap image, a TIFF image, or a PDF document).

Each workstation may include a camera and a projector that are oriented toward the workspace surface. For example, workstation A (120a) includes camera A (121a) and projector A (122a) that are oriented toward the workspace surface A (123a) and workstation B (120b) includes camera B (121b) and projector B (122b) that are oriented toward the workspace surface B (123b), etc. Each camera (e.g., camera A (121a) and camera B (121b)) may be any off-the-shelf camera without special optics or hardware. Each projector (e.g., projector A (122a) and projector B (122b)) may be any off-the-shelf projector without special optics or hardware. Alternatively, the camera and projector of a workstation may be customized devices with special optics or hardware. Each workspace surface (e.g., workspace surface A (123a) and workspace surface B (123b)) may be a surface of any type (e.g., a desk, a wall, a whiteboard, and a floor). The workspace surface may be a planar surface. Alternatively, the workspace surface may be a curved surface. Each workstation may further include hardware and/or software with computing and communication functionality to interface with the components (102, 110, 111, 112, 113, and 114).

In one or more embodiments, the workspace image (104) includes a captured image of the workspace surface of a workstation. In an example scenario, the workspace image (104) may be captured using the camera A (121a) and is the image of the workspace surface A (123a). In this example scenario, the workspace image (104) represents the workspace surface A (121a) based on a scale determined by a camera pixel resolution of the camera A (121a) and a camera distance of the camera A (121a) with respect to the workspace surface A (121a). The camera scale ratio corresponds to a ratio between a physical dimension of the workspace surface A (123a) and corresponding image pixel count (or other dimensional measure) in the workspace image (104). The camera scale ratio may vary across the workspace surface A (123a) if the optical axis of the camera A (121a) is not perpendicular to the workspace surface A (123a) due to the camera angle of the camera A (121a). Accordingly, an object on the workspace surface A (123a) may appear elongated, shortened, widened, narrowed, and/or otherwise distorted in the workspace image (104). In other words, the workspace image (104) has a device dependent scale and distortion (i.e., is affected by the capabilities and properties of the camera).

The device independent image (105) is a derived image generated by applying the calibrated camera transformation (107) to the workspace image (104) to compensate for the device dependent scale and distortion of the workspace image (104). For example, the scale of the device independent image (105) may correspond to a physical dimension of the real world. Specifically, the scale of the device independent image (105) is constant across the workspace surface A (121a) and is independent of the camera pixel resolution and the camera distance. To properly compensate for the device dependent scale and distortion of the workspace image (104), the calibrated camera transformation (107) is specific to each workstation generating the workspace image (104) and is generated according to a calibration process described in reference to FIG. 2 below.

The scaled image (106) is an image to be projected onto the workspace surface. Continuing with the example scenario above, the scaled image (106) may be projected using projector B (122b) to overlay and form an AR environment on workspace surface B (123b). Within the AR environment, the user of workstation B (120b) may add collaborative content to be combined with the scaled image (106). To achieve proper scaling in the AR environment, the scale of the scaled image (106) is determined based on the projector pixel resolution of projector B (122b) and the projector distance of projector B (122b) with respect to the workspace surface B (123b). The projector scale ratio is a ratio between a physical dimension of the workspace surface B (123b) and a corresponding image pixel count (or other dimensional measure) in the scaled image (106). The projector scale ratio may vary across the workspace surface B (123*b*) if the optical axis of the projector B (122*b*) is not perpendicular to the workspace surface B (123*b*) due to the projector angle of the projector B (122*b*).

In the example scenario above, the collaborative content from workstation A (120*a*) may be made available in the AR environment of workstation B (120*b*). Specifically, the device independent image (105) is derived from the workspace image (104) and contains the collaborative content captured using camera A (121*a*) of workstation A (120*a*). The scaled image (106) is generated by applying the calibrated projector transformation (108) to the device independent image (105). This results in the scaled image (106) containing the collaborative content from workstation A (120*a*) at a proper scale for the AR environment at workstation B (120*b*).

In one or more embodiments, the system (100) further includes the calibration engine (110). The calibration engine (110) may be implemented in hardware (i.e., circuitry), software, or any combination thereof. The calibration engine (110) is configured to generate the calibrated camera transformation (107) based on a physical template and generate the calibrated projector transformation (108) based on a projector template. The physical template is a physical object having one or more physical markers at one or more physical marker locations in the physical template. The physical markers are surface features that have unique shapes, color, or other optically detectable characteristics distinct from the rest of the surface of the physical object. In particular, the physical marker locations are specified based on a pre-determined physical scale. For example, the physical template may be a two-dimensional physical object that is placed on the workspace surface where each physical marker location is specified as two-dimensional coordinates in centimeter, inch, or other physical scale unit. The projector template is an image having one or more projector markers at one or more projector marker locations in the projector template. The one or more projector markers are isolated pixel groups that have unique shapes, color, or other optically projectable characteristics distinct from the rest of the pixels in the projector template. In particular, the projector marker locations are specified based on the projector pixel resolution of the projector device. For example, the projector template may be projected onto the workspace surface where each projector marker is projected to a corresponding physical location having two-dimensional coordinates in centimeter, inch, or other physical scale unit.

The calibration engine (110) generates the calibrated camera transformation (107) and the calibrated projector transformation (108) using the method described in reference to FIG. 2 below.

In one or more embodiments, the system (100) further includes the CT engine (111). The CT engine (111) may be implemented in hardware (i.e., circuitry), software, or any combination thereof. The CT engine (111) is configured to generate the device independent image (105) from the workspace image (104) based at least on the calibrated camera transformation (107). The CT engine (111) may generate the device independent image (105) periodically or intermittently throughout the collaborative work session, or in response to a request from one or more users of the workstations. The CT engine (111) applies the calibrated camera transformation (107) to the workspace image (104) to transform the collaborative content to the device independent scale in the device independent image (105). This is described in more detail below in reference to FIG. 2.

In one or more embodiments, the system (100) further includes the PT engine (112). The PT engine (112) may be implemented in hardware (i.e., circuitry), software, or any combination thereof. The PT engine (112) is configured to generate the scaled image (106) from the device independent image (105) based at least on the calibrated projector transformation (108). The PT engine (112) may generate the scaled image (106) periodically or intermittently throughout the collaborative work session, or in response to a request from one or more users of the workstations. The PT engine (112) applies the calibrated projector transformation (108) to the device independent image (105) to transform the collaborative content to the proper scale in the scaled image (106). This is described in more detail below in reference to FIG. 2.

In one or more embodiments, the system (100) further includes the alignment engine (114). The alignment engine (114) may be implemented in hardware (i.e., circuitry), software, or any combination thereof. The alignment engine (114) is configured to align collaborative contents from multiple workstations. The user may draw an object on a piece of paper that is placed on the workspace surface at an arbitrary orientation. For example, the boundary of the paper on the workspace surface A (123*a*) may form an arbitrary angle with an edge of the workspace surface A (123*a*). Accordingly, the output image of camera A (121*a*) includes an image of the paper showing the drawn object where the boundary of the image of the paper may be tilted within the output image. The alignment engine (114) further includes the functionality to detect the paper boundary on the workspace surface A (123*a*). Accordingly, the alignment engine (114) may crop the output image of camera A (121*a*) such that the workspace image (104) aligns with the paper boundary. Alternatively, the alignment engine (114) may provide the paper boundary information to other components of the system (100) where the cropping is performed.

In another example, the boundary of the paper on workspace surface B (123*b*) may form an arbitrary angle with an edge of the workspace surface B (123*b*). Accordingly, collaborative content in the scaled image (106) being projected by projector B (122*b*) may not align with the boundary of the paper on workspace surface B (123*b*). The alignment engine (114) further includes the functionality to detect the paper boundary on the workspace surface B (123*b*). Accordingly, the alignment engine (114) may rotate the collaborative content in the scaled image (106), or rotate the scaled image (106) itself, such that the projected scaled image (106) aligns with the paper boundary on workspace surface B (123*b*). Alternatively, the alignment engine (114) may provide the paper boundary information to other components of the system (100) where the rotation is performed.

The alignment method of the alignment engine (114) described in more detail below with reference to FIG. 2.

In one or more embodiments, the system (100) further includes the CI engine (113). The CI engine (113) may be implemented in hardware (i.e., circuitry), software, or any combination thereof. The CI engine (113) is configured to combine multiple device independent images containing collaborative contents from multiple workstations into a single composite device independent image (herein referred to as "a single composite image"). The CI engine (113) may generate the composite image as an intermediate result or as the final product of the collaborative work session. The CI engine (113) may also generate the composite image periodically or intermittently throughout the collaborative work session, or in response to a request from one or more users of the workstations.

Although the system (100) is shown having six components (102, 110, 111, 112, 113, and 114) communicating with two workstations (120*a* and 120*b*), in other embodiments of the invention, the system (100) may have more or fewer components communicating with any number of workstations. Furthermore, the functionality of each component described above may be shared among multiple components. For example, the alignment engine (114), or a portion thereof, may be embedded within the CT engine (111) and/or the PT engine (112). The components (102, 110, 111, 112, 113, and 114) may be centralized and remotely located from the workstations. Alternatively, the functionality of one or more of the components (102, 110, 111, 112, 113, and 114) may be distributed and/or duplicated in one or more workstations. In addition, each component (102, 110, 111, 112, 113, and 114) may be utilized multiple times in serial or parallel to carry out an iterative operation.

Figure 2:
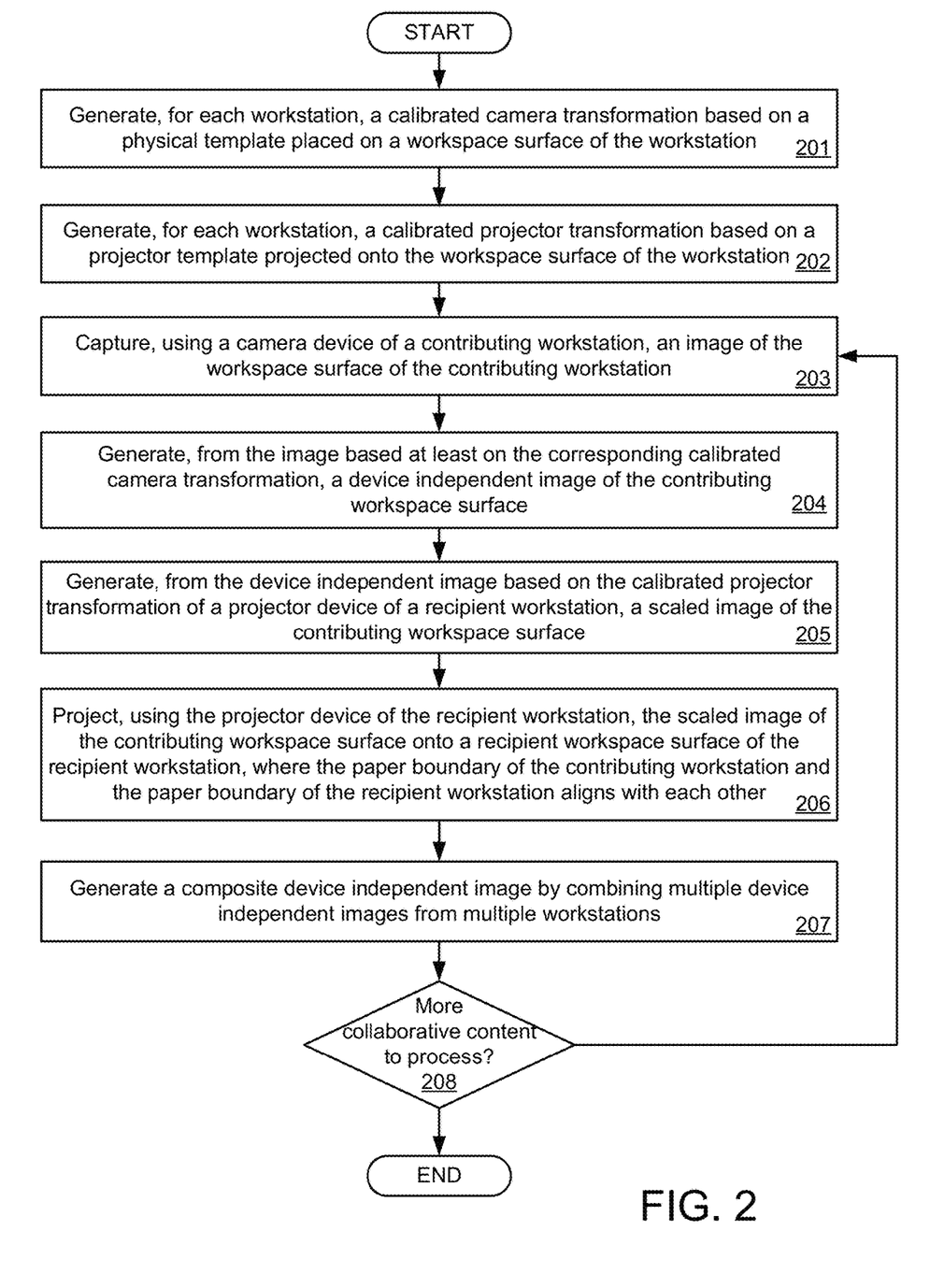
FIG. 2 shows a flowchart in accordance with one or more embodiments of the invention.

FIG. 2 shows a flowchart in accordance with one or more embodiments of the invention. One or more of the steps in FIG. 2 may be performed by the components of the system (100), discussed above in reference to FIG. 1. In one or more embodiments of the invention, one or more of the steps shown in FIG. 2 may be omitted, repeated, and/or performed in a different order than the order shown in FIG. 2. Accordingly, the scope of the invention should not be considered limited to the specific arrangement of steps shown in FIG. 2.

Referring to FIG. 2, initially in Step 201, a calibrated camera transformation is generated for each workstation. During the calibration process, a physical template is placed on the workspace surface of the workstation. One or more physical markers are embedded in the physical template at one or more physical marker locations. In particular, the physical marker locations are specified based on a pre-determined physical scale, such as inch, centimeter, etc. Identical physical templates are used for multiple workstations. Alternatively, different physical templates based on the same pre-determined physical scale may be used for multiple workstations. In one or more embodiments, the physical template may be embedded on the workspace surface for one or more workstations. For example, the physical markers may be inscribed on, painted on, molded in, or otherwise attached to the workspace surface.

Continuing with the calibration process, a physical template image of the physical template placed on the workspace surface is captured using a camera device of the workstation. Within the physical template image, each physical marker is detected at a corresponding pixel location (herein referred to as "the transformed physical marker location"). Specifically, the transformed physical marker location is specified based on the camera pixel resolution of the camera device. Accordingly, the physical marker locations based on the pre-determined physical scale and the transformed physical marker locations based on the camera pixel resolution are compared to generate a comparison result.

The comparison result includes a camera mapping table where the physical scale based coordinates of each physical marker location and the camera pixel based coordinates of the corresponding transformed physical marker location are stored as one entry of the camera mapping table. Discrete entries of the camera mapping table are interpolated and/or extrapolated to generate a mathematical mapping function that is used as the calibrated camera transformation of the workstation. In one or more embodiments, further in Step 201, the process above is repeated for each workstation to generate one calibrated camera transformation for each workstation.

In Step 202, a calibrated projector transformation is generated for each workstation. During the calibration process, a projector template is projected onto the workspace surface using the projector device of the workstation. One or more projector markers are included in the projector template at one or more projector marker locations. In particular, the projector marker locations are specified based on the projector pixel resolution of the projector device. The projector markers are projected onto the workspace to form a physical pattern. The physical pattern of projected projector markers is identical for all or some of the workstations. Alternatively, the projected projector markers may be different for different workstations.

Continuing with the calibration process, a projector template image of the workspace having the projected projector markers are captured using the camera device of the workstation. The projector template image includes the physical pattern formed by the projected projector markers. Within the projector template image, each projector marker is detected at a corresponding pixel location (herein referred to as "the transformed projector marker location"). Specifically, the transformed projector marker location is specified based on the camera pixel resolution of the camera device. Accordingly, the projector marker locations based on the projector pixel resolution and the transformed projector marker locations based on the camera pixel resolution are compared to generate a comparison result.

The comparison result includes a projector mapping table where the projector pixel based coordinates of each projector marker location and the camera pixel based coordinates of the corresponding transformed projector marker location are stored as one entry of the projector mapping table. Discrete entries of the projector mapping table are interpolated and/or extrapolated to generate a mathematical mapping function that is used as the calibrated projector transformation of the workstation. In one or more embodiments, further in Step 202, the process above is repeated for each workstation to generate one calibrated projector transformation for each workstation.

The calibration session described in Steps 201-202 are performed using the calibration engine depicted in FIG. 1 above. Once the calibration session is complete by performing above Steps 201 and 202, the collaborative work session is performed in Steps 203-208 discussed below. The collaborative work session described in Steps 203-208 are performed using the CT engine, PT engine, CI engine, and alignment engine described above in reference to FIG. 1.

In Step 203, during the collaborative work session, an image of a workspace surface is captured using the camera device of the workstation. The image capture is activated by the user of the workstation when the user is ready to share collaborative content. Alternatively, the image may be captured periodically or intermittently throughout the collaborative session. The image includes a collection of camera pixels based on the camera pixel resolution of the camera device. Specifically, the collection of camera pixels represent the collaborative content contributed by the user of the workstation. The collaborative content includes what the user draws or writes on a piece of paper (or any other medium) placed on the workspace surface. In one or more embodiments, the paper boundary of the paper is detected within the image of the workspace surface. Accordingly, the image is cropped such that the edges of the cropped image correspond to the paper boundary. In other words, the portion of the image that is outside of the paper, thus not containing any collaborative content, is excluded from the cropped image.

In Step 204, a device independent image of the workspace surface is generated from the cropped image based at least on the calibrated camera transformation of the workstation. The edges of the device independent image correspond to the paper boundary in the same manner as the cropped image. The device independent image is sent to a different workstation used by a different user. In this context, the user contributing the collaborative content contained in the device independent image is referred to as the contributing user. The different workstation and the different user that receive the device independent image containing the collaborative content are referred to as the recipient workstation and the recipient user, respectively.

In Step 205, a scaled image of the workspace surface of the contributing workstation is generated from the device independent image based on the calibrated projector transformation of the recipient workstation. The edges of the scaled image correspond to the paper boundary in the same manner as the device independent image and the cropped image of the contributing workstation.

In Step 206, the scaled image of the workspace surface of the contributing workstation is projected using the projector device of the recipient workstation onto the workspace surface of the recipient workstation. Projecting the scaled image containing the collaborative content onto the workspace surface of the recipient workstation is activated by the recipient user. Alternatively, the scaled image may be generated and projected periodically or intermittently throughout the collaborative session.

Furthermore, the recipient user draws or writes on a piece of paper (or any other medium) placed on the workspace surface of the recipient workstation. The paper boundary of the paper of the recipient workstation is detected by the camera device of the recipient workstation. Accordingly, the scaled image is rotated such that the edges of the scaled image is projected onto the paper boundary of the recipient workstation. Because the edges of the scaled image correspond to the paper boundary of the contributing workstation, the paper boundary of the contributing workstation is projected onto the paper boundary of the recipient workstation. In this context, the paper boundary of the contributing workstation and the paper boundary of the recipient workstation are said to align with each other when the scaled image is projected onto the workspace surface of the recipient workstation.

In one or more embodiments, projecting the scaled image of the contributing workstation onto the workspace surface of the recipient workstation facilitates the recipient user to create additional collaborative content to share with other collaborative users, including the particular contributing user above.

In Step 207, a composite device independent image is generated by combining multiple device independent images from multiple contributing workstations. The composite device independent image may be generated in response to a request from any of the users during the collaborative work session or as a final product of the collaborative work session. The composite device independent image may be stored in a data repository or sent to a printer to be printed as a physical copy.

In Step 208, a determination is made as to whether any collaborative content remains to be processed. For example, the remaining collaborative content may be generated by the recipient user. In another example, a different contributing user may have created additional collaborative content and have requested to send the additional collaborative content for sharing. If the determination is positive (i.e., at least one piece of collaborative content remains to be processed), the method returns to Step 203. If the determination is negative (i.e., no more collaborative content remains to be processed), the method ends.

In an application of the system and method described in reference to FIGS. 1 and 2 above, multiple remote users may collaborate to create a document or drawing on paper (or any other medium) with merged physical and virtual collaborative contents. In a collaboration work session, each user contributes by writing or drawing on a piece of paper placed under the camera-projector assembly, using a conventional pen or pencil. An image of the paper content is then shared to one or more remote collaborators by transmitting the imagery of the paper captured by the overhead camera. After reaching each of the remote workstations, the image is merged with content transmitted from other workstations, and projected onto the paper, on which the user local to that workstation contributes his/her creation. At any time during the collaboration work session or after the collaboration work session, each user may choose to save the combined work product to a file or print the combined work product using a printer.

FIGS. 3A-3D show an implementation example in accordance with one or more embodiments of the invention. The implementation example shown in FIGS. 3A-3D is based on the system and method flowchart described in reference to FIGS. 1 and 2 above. Specifically, elements depicted in FIG. 1 and FIGS. 3A-3D with like reference designators correspond to each other. In one or more embodiments of the invention, one or more of elements shown in FIGS. 3A-3D may be omitted, repeated, and/or organized in a different arrangement. Accordingly, the scope of the invention should not be considered limited to the specific arrangement of elements shown in FIGS. 3A-3D.

In one or more embodiments, the example implementation shown in FIGS. 3A-3D corresponds to a collaborative work session when users of the workstation A (120a) and workstation B (120b), discussed above in reference to FIG. 1, exchange collaborative contents periodically to complete the final product.

A calibration session is performed prior to commencing the collaborative work session. During the calibration session, the spatial relationship between the projector and camera for each workstation is obtained via a self-calibration process as follows:

1) Derive relative position and angle between what the projector projects (i.e., projected image) and what the camera sees (i.e., field of view):
   a) A template image, containing markers placed at known coordinates, is projected onto the workspace surface.
   b) The camera captures an image of the workspace surface.
   c) Software algorithm locates markers in the image, and maps each located marker to a counterpart with known coordinates in the template image.
   d) For the planar workspace surface, a homography transformation matrix (Hcp) is computed from the coordinates of located markers in the image captured by the camera, and the known coordinates in the projected template image. In the case where the workspace surface is not a planar surface, a different type of transformation matrix is computed based on the curved surface.
   e) This homography matrix (Hcp) is used to convert coordinates as seen by a camera (C) to coordinates being projected by the projector (P). Note that the Hcp is specific to the camera and the projector of a single workstation.

2) Derive the relative size between projected image and "world space" (W1) measurements (i.e. pixels to inches). The world space is the space where the coordinates are based on physical units, such as inch, centimeter, etc. Because the coordinates in the world space correspond to physical dimension in the real world, the world space is a device independent space. This step may be integrated into step 1 above by embedding markers onto the workspace surface. In other words, the physical template described below may include physical markers that are inscribed, stamped, or otherwise embedded onto the workspace surface.
  a) A physical template is placed on the workspace surface, containing markers placed at known distances from one another.
  b) The camera captures an image of the physical template on the workspace surface.
  c) Software algorithm locates markers in the image, and maps each located marker to a counterpart with known coordinates in the physical template.
  d) Choose a pair of markers whose physical distance is Dw in the world space (e.g., 8 inches).
  e) Transform markers' coordinates in camera space to projector space using previously obtained homography matrix Hcp. The camera space is the space where coordinates are based on pixels in the image captured by the camera (i.e., camera pixels). The projector space is the space where coordinates are based on pixels in the image projected by the projector (i.e., projector pixels). In this context and in contrast to the world space described above, both the camera space and the projector space are device dependent spaces.
  f) Compute the distance between the same pair of markers in the projector space (Dp) where Dp is measured in number of projector pixels.
  g) Derive the ratio between the distances: Rpw=Dw/Dp.
  h) R is the scale ratio from projector space to the world space.
  i) Dw may be defined in any units. The unit may be chosen with a dimension close to the pixel size of the camera to take full advantage of the camera resolution. For example, if camera resolution at the working distance of the setup is close to 250 dots-per-inch (dpi), a measurement of 1 unit in world space may be defined as (1/250) inch.
  j) Multiply 3×3 identity matrix by the scaler Rpw, and the resulting matrix is the transformation from projector space to world space (Hpw). In other words, multiplying the coordinates (based on projector pixels) of a marker in the projector template results in the coordinates (based on camera pixels) of a corresponding marker in the camera captured image of the projector template. The 3×3 identity matrix allows the workspace surface to be a curved surface, where the camera space and the projector space are based on three dimensional (3D) coordinates. In the case where the workspace surface is a planar surface, the camera space and the projector space may be simplified to be based on two dimensional (2D) coordinates, and the 3×3 identity matrix may be then replaced by a 2×2 identity matrix.

3) Derive the transformation from camera space (C) to world space (W) a) Based on the transformations from camera space to projector space (Hcp) and the transformation from projector space and world space (Hpw), the transformation from camera space to world space is the multiplication of Hcp and Hcp: Hcw=Hcp×Hpw.

4) The transformations Hcp, Hpw and Hcw are inverted where the inverted transformations are denoted as Hpc, Hwp and Hwc, respectively. Note that the transformations Hcp, Hpw and Hcw, and their inverted transformations Hpc, Hwp and Hwc, as generated in the self-calibration process for each workstation, are specific to the particular workstation under calibration.

Figure 3A:
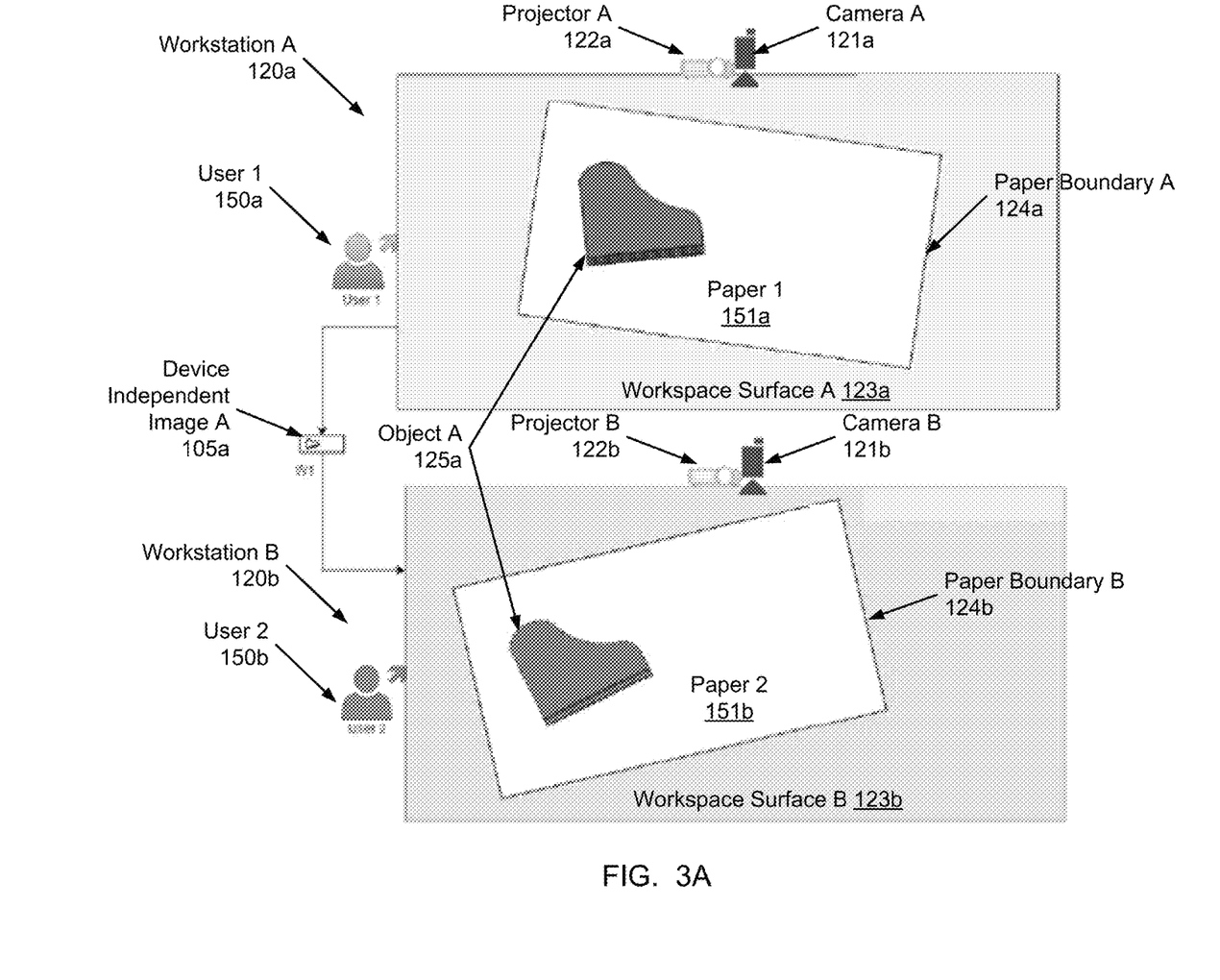
FIGS. 3A-3D show an implementation example in accordance with one or more embodiments of the invention.
Figure 3B:
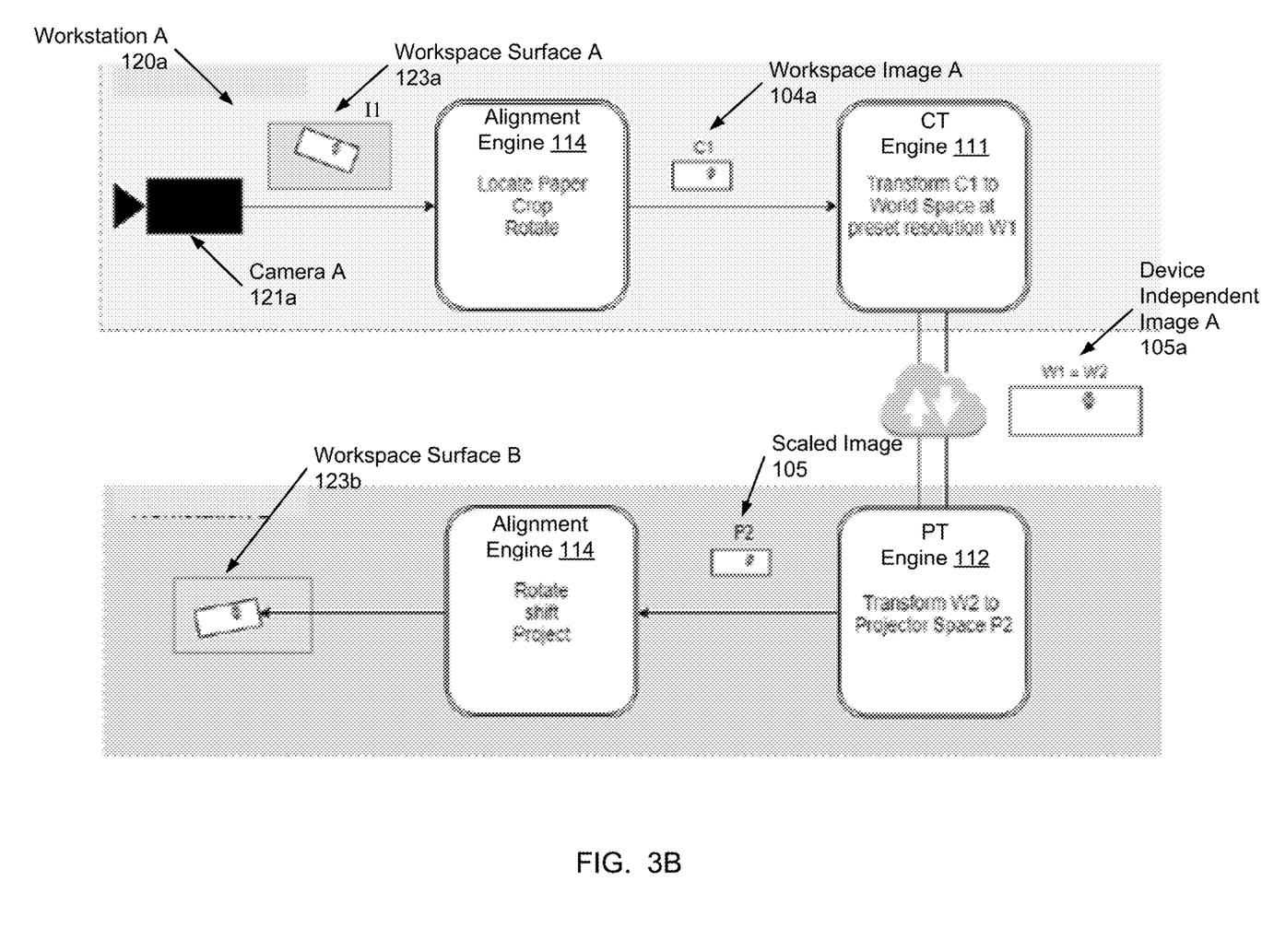
Figure 3C:
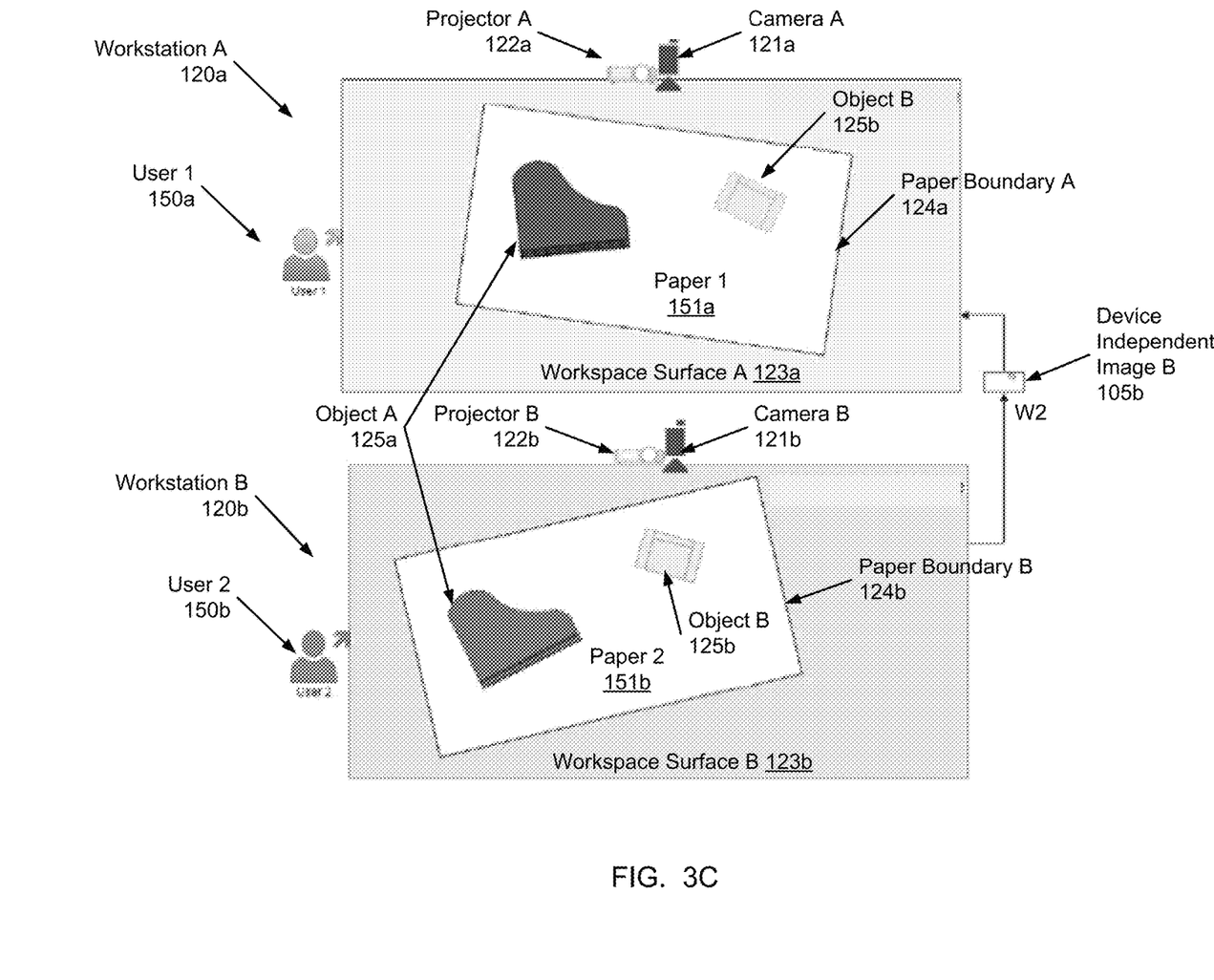
Figure 3D:
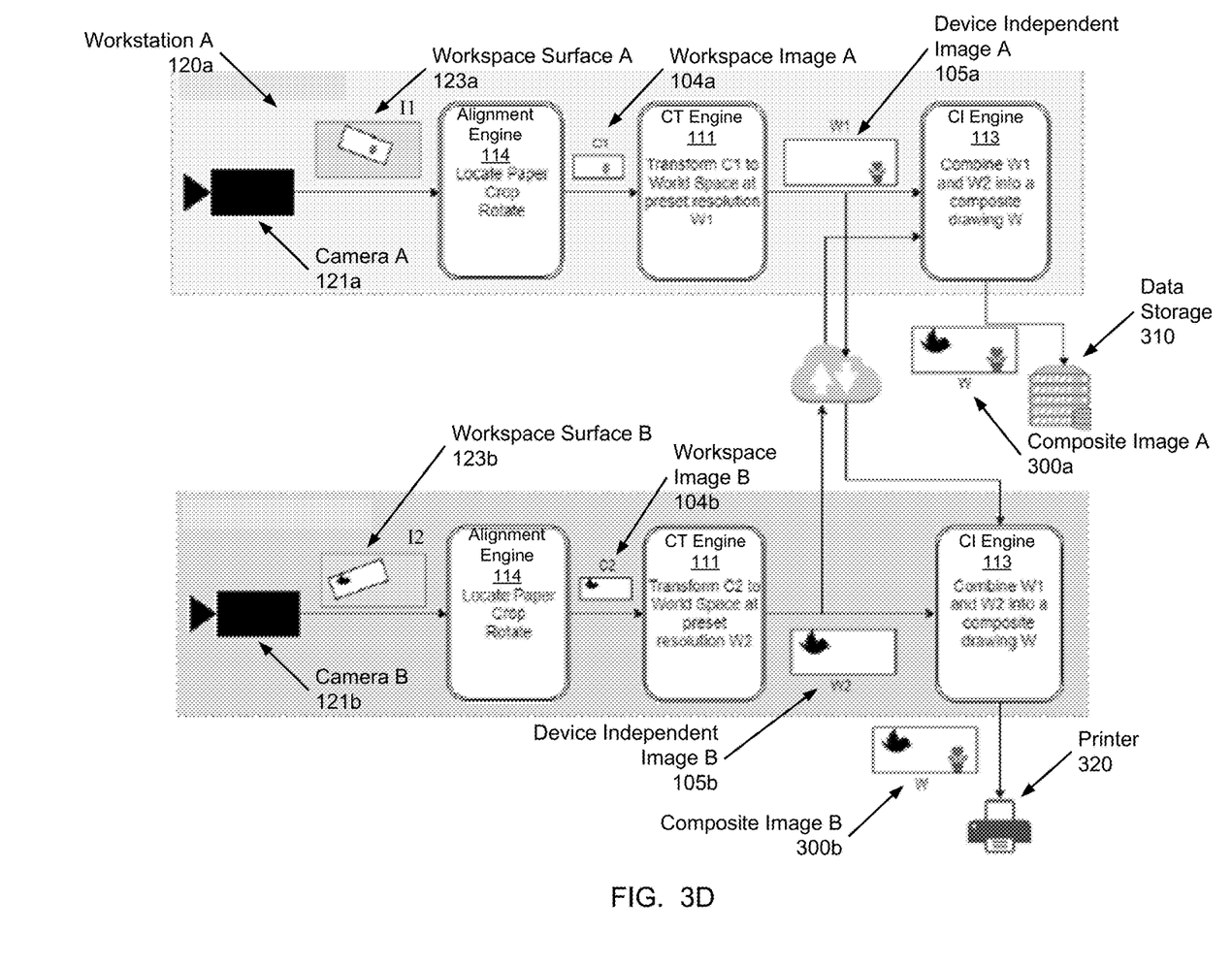

As shown in FIGS. 3A-3D, subsequent to the calibration session, two collaborative users, namely User 1 (150*a*) on the workstation A (120*a*) and User 2 (150*b*) on workstation B (120*b*), exchange collaborative content in the example collaboration work session. In particular, FIG. 3A shows a first portion of the collaborative work session corresponding to below Steps 4-9. As shown in FIG. 3A, the collaborative content (e.g., object A (125*a*) drawn by User 1 (150*a*)) is created and transmitted to workstation B (120*b*). FIG. 3B shows a process flow performed by the alignment engine (114), CT engine (111), and PT engine (112) for the first portion of the collaborative work session shown in FIG. 3A. FIGS. 3C and 3D show a second portion of the collaborative work session corresponding to below Steps 10-13. As shown in FIG. 3C, the collaborative content (e.g., object B (125*b*) drawn by the User 2 (150*b*)) is created and transmitted to workstation A (120*a*). As shown in FIG. 3D, the collaborative content (e.g., object A (125*a*) drawn by the User 1 (150*a*) and object B (125*b*) drawn by the User 2 (150*b*)) are combined to generate a composite image A (300*a*). For example, the composite image A (300*a*) is sent to a data storage (310) and the composite image B (300*b*) is sent to a printer (320).

1) As shown in FIGS. 3A and 3B, each user establishes a connection to a known messaging server, and connects to the same collaboration session.
2) As shown in FIG. 3A, each user places a piece of paper on his/her workspace surface.
3) As shown in FIG. 3A, the system locates the paper (or any other medium) on each system (illustrated as Paper 1 (151*a*) and Paper 2 (151*b*), respectively). For example, the paper may be located and paper boundary defined based on the contrast against the background of the workspace surface. Paper 1 (151*a*) has the paper boundary A (124*a*) and Paper 2 (151*b*) has the paper boundary B (124*b*).
4) As shown in FIG. 3A, User 1 (150*a*) draws an object A (125*a*) on the Paper 1 (151*a*).
5) As shown in FIG. 3B, when User 1 (150*a*) is ready to share his work, image (I1) of workspace surface A (123*a*) of workstation A (120*a*) is captured by the camera A (121*a*) at workstation A (120*a*) with projector A (122*a*) turned off.
6) As shown in FIG. 3B, the alignment engine (114) detects the paper boundary A (124*a*) in I1, for example based on contrast between Paper 1 (151*a*) and background of the workspace surface A (124*a*). The alignment engine (114) then isolates the portion of I1 corresponding to Paper 1 (151*a*) by cropping I1 based on the paper boundary A (124*a*), resulting in the workspace image A (104*a*), denoted as C1. C1 is an upright and cropped image of I1 in camera space (C1).
7) As shown in FIG. 3B, the CT engine (111) transforms C1 into a device independent image A (105*a*) in the world space using Hcw(1), which is the calibrated camera transformation for workstation A (120*a*). The device independent image A (105*a*) is denoted as W1. In particular, W1 has a device independent scale. In other words, the dimension of object A (125*a*) in W1 has a physical unit (e.g., inch or centimeter) and is independent of which workstation object A (125*a*) is placed and imaged. If the same object A (125*a*) were to be placed on the workspace surface B (123*b*) and imaged using camera B (121*b*) then subsequently transformed into a device independent image B (105*b*), the dimension of the object A (125*a*) in the device independent image A (105*a*) and the dimension of the object A (125*a*) in the device independent image B (105*b*) would be the same.

8) As shown in both FIGS. 3A and 3B, W1 is transmitted to workstation B (120*b*).

9) As shown in both FIGS. 3A and 3B, upon receiving W1 at workstation B (120*b*), the content of W1 is projected onto the Paper 2 (151*b*) on workspace surface B (123*b*). As shown in FIG. 3A, while the object A (125*a*) on the paper 1 (151*a*) is drawn by User 1 (150*a*), the object A (125*a*) on the paper 2 (151*b*) is projected by projector B (122*b*). What User 2 (150*b*) sees on Paper 2 (151*b*) is identical to what User 1 (150*a*) drew on Paper 1 (151*a*), regardless of how Paper 2 (151*b*) is placed on the workspace surface B (123*b*). This is accomplished when the PT engine (112) transforms W1 from the world space to the projector space of workspace B (123*b*) to generate the scaled image (105) for projector B (122*b*), which is denoted as P2 in FIG. 3B. In particular, P2=Hwp(2)×W1 where Hwp(2) is the calibrated projector transformation for workstation B (120*b*). P2 is further rotated and/or shifted by the alignment engine (114) to align with the paper boundary B (124*b*) before being projected onto the Paper 2 (151*b*).

10) As shown in FIG. 3C, upon seeing P2 (i.e., the scaled image (105)) projected onto Paper 2 (151*b*), User 2 (150*b*) draws additional content on Paper 2. For example, the additional content may include the object B (125*b*).

11) As shown in FIGS. 3C and 3D, Steps 4-9 are repeated to transmit collaborative content (e.g., object B (125*b*) drawn by user B (150*b*)) from workstation B (120*b*) to workstation A (120*a*). Image (I2) of the workspace surface B (123*b*) is captured by camera B (121*b*) with projector B (122*b*) turned off. I2 includes the drawn object B (125*b*) but not the projected object A (125*a*). While not explicitly shown, I2 is then cropped by the alignment engine (114) and transformed by the CT engine (111) into the device independent image B (105*b*), denoted as W2. The scaled mage (105) for projector A (122*a*), denoted as P1, is then generated using the calibrated projector transformation Hwp(1) for workstation A (120*a*). Specifically, P1=Hwp(1)×W2, which is projected onto Paper 1 (151*a*) at the workstation A (120*a*). At that point, what User 1 (150*a*) sees on Paper 1 (151*a*) is identical to what User 2 (150*b*) sees on Paper 2 (151*b*).

12) One round of collaboration is complete as Steps 1-11 are performed.

13) As shown in FIG. 3D, when either User 1 (150*a*) or User 2 (150*b*) chooses to save or print the collaboration result, W1 and W2 are combined by the CI engine (113) to form the composite image A (300*a*) or composite image B (300*b*), which is a rendition of a final result W. When the final result W is sent to printer (320) at the same resolution of the World Space (i.e. 250 dpi), the printed image appears identical to either Paper 1 (151*a*) or Paper 2(151*b*).

While specific examples of the object A (125*a*) and object B (125*b*) are shown as a piano and a sofa chair in FIGS. 3A and 3C, and shown as a potted flower and a flying bird in FIG. 3D, object A (125*a*) and object B (125*b*) may be drawn in any shapes chosen by User 1 (150*a*) and User 2 (150*b*).

Figure 4:
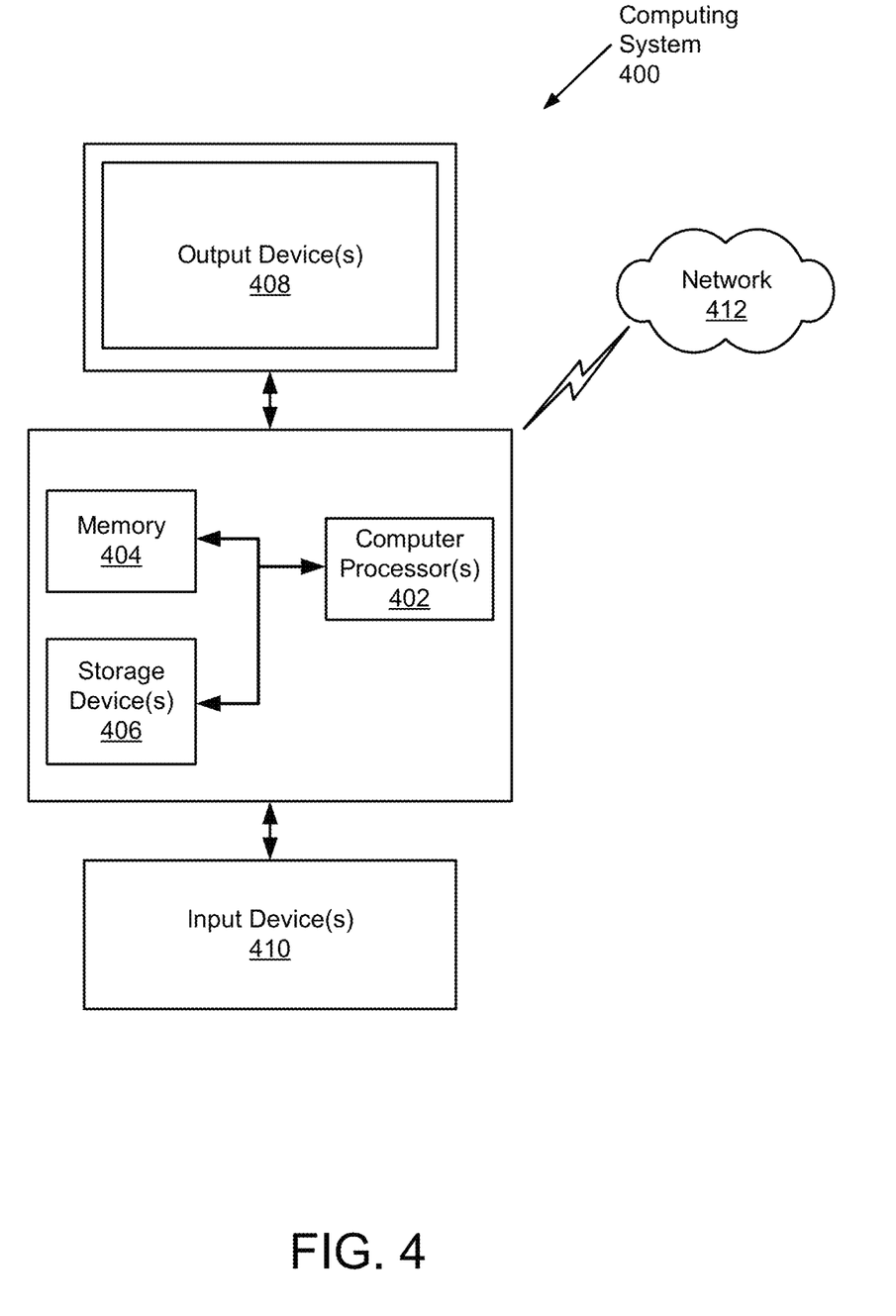
FIG. 4 shows a computing system in accordance with one or more embodiments of the invention.

Embodiments of the invention may be implemented on virtually any type of computing system, regardless of the platform being used. For example, the computing system may be one or more mobile devices (e.g., laptop computer, smart phone, personal digital assistant, tablet computer, or other mobile device), desktop computers, servers, blades in a server chassis, or any other type of computing device or devices that includes at least the minimum processing power, memory, and input and output device(s) to perform one or more embodiments of the invention. For example, as shown in FIG. 4, the computing system (400) may include one or more computer processor(s) (402), associated memory (404) (e.g., random access memory (RAM), cache memory, flash memory, etc.), one or more storage device(s) (406) (e.g., a hard disk, an optical drive such as a compact disk (CD) drive or digital versatile disk (DVD) drive, a flash memory stick, etc.), and numerous other elements and functionalities. The computer processor(s) (402) may be an integrated circuit for processing instructions. For example, the computer processor(s) may be one or more cores, or micro-cores of a processor. The computing system (400) may also include one or more input device(s) (410), such as a touchscreen, keyboard, mouse, microphone, touchpad, electronic pen, or any other type of input device. Further, the computing system (400) may include one or more output device(s) (408), such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device(s). The computing system (400) may be connected to a network (412) (e.g., a local area network (LAN), a wide area network (WAN) such as the Internet, mobile network, or any other type of network) via a network interface connection (not shown). The input and output device(s) may be locally or remotely (e.g., via the network (412)) connected to the computer processor(s) (402), memory (404), and storage device(s) (406). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that when executed by a processor(s), is configured to perform embodiments of the invention.

Further, one or more elements of the aforementioned computing system (400) may be located at a remote location and be connected to the other elements over a network (412). Further, one or more embodiments of the invention may be implemented on a distributed system having a plurality of nodes, where each portion of the invention may be located on a different node within the distributed system. In one embodiment of the invention, the node corresponds to a distinct computing device. Alternatively, the node may correspond to a computer processor with associated physical memory. The node may alternatively correspond to a computer processor or micro-core of a computer processor with shared memory and/or resources.

One or more of the embodiments of the invention may have one or more of the following advantages and improvements over conventional image processing and AR related technologies: the ability to use various cameras and projectors installed at various workstations that have not been previously aligned and calibrated to one another, the ability to use off-the-shelf cameras and projectors without special optics or hardware, the ability to use cameras and projectors where the camera plane and/or projector angle are not parallel to the workspace surface (e.g., drawing paper), the ability to use cameras and projectors with respective positions and angles completely unknown to the system, the ability to use cameras and projectors with minimal user intervention to perform hardware setup or calibration, the ability to use any type of paper (or any other writing medium) with arbitrary paper location on each workstation that may change during the collaborative session.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method to process collaborative contents from multiple workspace surfaces, comprising:
    capturing, using a first camera device, a first image of a first workspace surface, wherein the first camera device and a first projector device are associated with the first workspace surface;
    generating, by a computer processor and from the first image based at least on a calibrated camera transformation of the first camera device, a first device independent image of the first workspace surface, wherein the calibrated camera transformation of the first camera device is based on a camera pixel resolution of the first camera device, and a camera angle and a camera distance of the first camera device in reference to the first workspace surface;
    generating, by the computer processor and from the first device independent image based on a calibrated projector transformation of a second projector device, a first scaled image of the first workspace surface, wherein the calibrated projector transformation of the second projector device is based on a projector pixel resolution of the second projector device, and a projector angle and a projector distance of the second projector device in reference to a second workspace surface, wherein a second camera device and the second projector device are associated with the second workspace surface; and
    projecting, using the second projector device, the first scaled image of the first workspace surface onto the second workspace surface.

2. The method of claim 1, further comprising:
    capturing, using the second camera device, a second image of the second workspace surface; and
    generating, from the second image based at least on the calibrated camera transformation of the second camera device, a second device independent image of the second workspace surface, wherein the calibrated camera transformation of the second camera device is based on the camera pixel resolution of the second camera device, and the camera angle and the camera distance of the second camera device in reference to the second workspace surface.

3. The method of claim 2, further comprising:
    generating, from the second device independent image based on the calibrated projector transformation of the first projector device, a second scaled image of the second workspace surface, wherein the calibrated projector transformation of the first projector device is based on the projector pixel resolution of the first projector device, and the projector angle and the projector distance of the first projector device in reference to the first workspace surface; and
    projecting, using the first projector device, the second scaled image of the second workspace surface onto the first workspace surface.

4. The method of claim 3, further comprising:
    detecting, within the first image of the first workspace surface, a first paper boundary of a first paper placed on the first workspace surface;
    detecting, within the second image of the second workspace surface, a second paper boundary of a second paper placed on the second workspace surface,
    wherein the first scaled image of the first workspace surface comprises the first paper boundary that is projected onto the second workspace surface to align with the second paper boundary, and
    wherein the second scaled image of the second workspace surface comprises the second paper boundary that is projected onto the first workspace surface to align with the first paper boundary.

5. The method of claim 3,
    wherein capturing the first image is activated a first user of the first workspace surface and subsequent to the first user adding a first object to the first workspace surface,
    wherein the first scaled image of the first workspace surface projected onto the second workspace surface facilitates a second user of the second workspace surface adding a second object to the second workspace surface,
    wherein capturing the second image is activated by the second user and subsequent to the second user adding the second object to the second workspace surface, and
    wherein the collaborative contents comprise the first object and the second object.

6. The method of claim 5,
    wherein projecting the first scaled image of the first workspace surface onto the second workspace surface is activated by the second user, and
    wherein projecting the second scaled image of the second workspace surface onto the first workspace surface is activated by the first user.

7. The method of claim 3, further comprising:
    generating a composite device independent image by combining the first device independent image of the first workspace surface and the second device independent image of the second workspace surface,
    wherein the collaborative contents comprise the composite device independent image.

8. The method of claim 1, further comprising:
    capturing, using the first camera device and from the first workspace surface, a physical template image of a physical template placed on the first workspace surface, wherein the physical template comprises one or more physical markers at one or more physical marker locations in the physical template, wherein the one or more physical marker locations are specified based on a pre-determined physical scale;

detecting, within the physical template image, the one or more physical markers at one or more transformed physical marker locations in the physical template image, wherein the one or more transformed physical marker locations are specified based on the camera pixel resolution of the first camera device;

comparing the one or more physical marker locations and the one or more transformed physical marker locations to generate a comparison result; and generating, based on at least on the comparison result, the calibrated camera transformation of the first camera device.

9. The method of claim 3, further comprising:

projecting, using the first projector device, a projector template onto the first workspace surface, wherein the projector template comprises one or more projector markers at one or more projector marker locations in the projector template, wherein the one or more projector marker locations are specified based on the projector pixel resolution of the first projector device;

capturing, using the first camera device and from the first workspace surface, a projector template image;

detecting, within the projector template image, the one or more projector markers at one or more transformed projector marker locations in the projector template image, wherein the one or more transformed projector marker locations are specified based on the camera pixel resolution of the first camera device;

comparing the one or more projector marker locations and the one or more transformed projector marker locations to generate a comparison result; and generating, based on at least on the comparison result, the calibrated projector transformation of the first projector device.

10. A system to process collaborative contents from multiple workspace surfaces, comprising:

a first workstations comprising a first camera device, a first projector device, and a first workspace surface, wherein the first camera device is configured to capture a first image of the first workspace surface;

a second workstations comprising a second camera device, a second projector device, and a second workspace surface, wherein the second projector device is configured to project a first scaled image of the first workspace surface onto the second workspace surface; and a computer processor configured to:
generate, from the first image based at least on a calibrated camera transformation of the first camera device, a first device independent image of the first workspace surface, wherein the calibrated camera transformation of the first camera device is based on a camera pixel resolution of the first camera device, and a camera angle and a camera distance of the first camera device in reference to the first workspace surface; and generate, from the first device independent image based on a calibrated projector transformation of the second projector device, the first scaled image of the first workspace surface, wherein the calibrated projector transformation of the second projector device is based on a projector pixel resolution of the second projector device, and a projector angle and a projector distance of the second projector device in reference to a second workspace surface.

11. The system of claim 10, wherein the second camera device is configured to capture a second image of the second workspace surface, wherein the computer processor is further configured to generate, from the second image based at least on the calibrated camera transformation of the second camera device, a second device independent image of the second workspace surface, and wherein the calibrated camera transformation of the second camera device is based on the camera pixel resolution of the second camera device, and the camera angle and the camera distance of the second camera device in reference to the second workspace surface.

12. The system of claim 11, wherein the computer processor is further configured to generate, from the second device independent image based on the calibrated projector transformation of the first projector device, a second scaled image of the second workspace surface, wherein the calibrated projector transformation of the first projector device is based on the projector pixel resolution of the first projector device, and the projector angle and the projector distance of the first projector device in reference to the first workspace surface, and wherein the first projector device is configured to project the second scaled image of the second workspace surface onto the first workspace surface.

13. The system of claim 12, wherein the computer processor is further configured to:

detect, within the first image of the first workspace surface, a first paper boundary of a first paper placed on the first workspace surface;

detect, within the second image of the second workspace surface, a second paper boundary of a second paper placed on the second workspace surface, wherein the first scaled image of the first workspace surface comprises the first paper boundary that is projected onto the second workspace surface to align with the second paper boundary, and wherein the second scaled image of the second workspace surface comprises the second paper boundary that is projected onto the first workspace surface to align with the first paper boundary.

14. The system of claim 12, wherein capturing the first image is activated a first user of the first workspace surface and subsequent to the first user adding a first object to the first workspace surface, wherein the first scaled image of the first workspace surface projected onto the second workspace surface facilitates a second user of the second workspace surface adding a second object to the second workspace surface, wherein capturing the second image is activated by the second user and subsequent to the second user adding the second object to the second workspace surface, and wherein the collaborative contents comprise the first object and the second object.

15. The system of claim 14, wherein projecting the first scaled image of the first workspace surface onto the second workspace surface is activated by the second user, and wherein projecting the second scaled image of the second workspace surface onto the first workspace surface is activated by the first user.

16. The system of claim 12, wherein the computer processor is further configured to:
  generate a composite device independent image by combining the first device independent image of the first workspace surface and the second device independent image of the second workspace surface,
  wherein the collaborative contents comprise the composite device independent image.

17. The system of claim 10,
  wherein the first camera device is further configured to capture, from the first workspace surface, a physical template image of a physical template placed on the first workspace surface, wherein the physical template comprises one or more physical markers at one or more physical marker locations in the physical template, wherein the one or more physical marker locations are specified based on a pre-determined physical scale,
  wherein the computer processor is further configured to:
    detect, within the physical template image, the one or more physical markers at one or more transformed physical marker locations in the physical template image, wherein the one or more transformed physical marker locations are specified based on the camera pixel resolution of the first camera device;
    compare the one or more physical marker locations and the one or more transformed physical marker locations to generate a comparison result; and
    generate, based on at least on the comparison result, the calibrated camera transformation of the first camera device.

18. The system of claim 12,
  wherein the first projector device is further configured to project a projector template onto the first workspace surface, wherein the projector template comprises one or more projector markers at one or more projector marker locations in the projector template, wherein the one or more projector marker locations are specified based on the projector pixel resolution of the first projector device;
  wherein the first camera device is further configured to capture, from the first workspace surface, a projector template image, and
  wherein the computer processor is further configured to
    detect, within the projector template image, the one or more projector markers at one or more transformed projector marker locations in the projector template image, wherein the one or more transformed projector marker locations are specified based on the camera pixel resolution of the first camera device;
    compare the one or more projector marker locations and the one or more transformed projector marker locations to generate a comparison result; and
    generate, based on at least on the comparison result, the calibrated projector transformation of the first projector device.

19. A non-transitory computer readable medium (CRM) storing computer readable program code to process collaborative contents from multiple workspace surfaces, wherein the computer readable program code, when executed by a computer processor, comprises functionality for:
  obtaining, from a first camera device, a first image of a first workspace surface, wherein the first camera device and a first projector device are associated with the first workspace surface;
  generating, from the first image based at least on a calibrated camera transformation of the first camera device, a first device independent image of the first workspace surface, wherein the calibrated camera transformation of the first camera device is based on a camera pixel resolution of the first camera device, and a camera angle and a camera distance of the first camera device in reference to the first workspace surface;
  generating, from the first device independent image based on a calibrated projector transformation of a second projector device, a first scaled image of the first workspace surface, wherein the calibrated projector transformation of the second projector device is based on a projector pixel resolution of the second projector device, and a projector angle and a projector distance of the second projector device in reference to a second workspace surface, wherein a second camera device and the second projector device are associated with the second workspace surface; and
  sending, to the second projector device, the first scaled image of the first workspace surface for projecting onto the second workspace surface.

20. The CRM of claim 19, the computer readable program code, when executed by the computer processor, further comprising functionality for:
  obtaining, from the second camera device, a second image of the second workspace surface;
  generating, from the second image based at least on the calibrated camera transformation of the second camera device, a second device independent image of the second workspace surface, wherein the calibrated camera transformation of the second camera device is based on the camera pixel resolution of the second camera device, and the camera angle and the camera distance of the second camera device in reference to the second workspace surface;
  generating, from the second device independent image based on the calibrated projector transformation of the first projector device, a second scaled image of the second workspace surface, wherein the calibrated projector transformation of the first projector device is based on the projector pixel resolution of the first projector device, and the projector angle and the projector distance of the first projector device in reference to the first workspace surface; and
  projecting, using the first projector device, the second scaled image of the second workspace surface onto the first workspace surface.

* * * * *